H. A. LACERDA.
SUPERHEATER FOR INTERNAL COMBUSTION ENGINES.
APPLICATION FILED JAN. 21, 1919.

1,338,511.

Patented Apr. 27, 1920.

WITNESSES:

INVENTOR
HARRY A. LACERDA
BY
ATTORNEYS

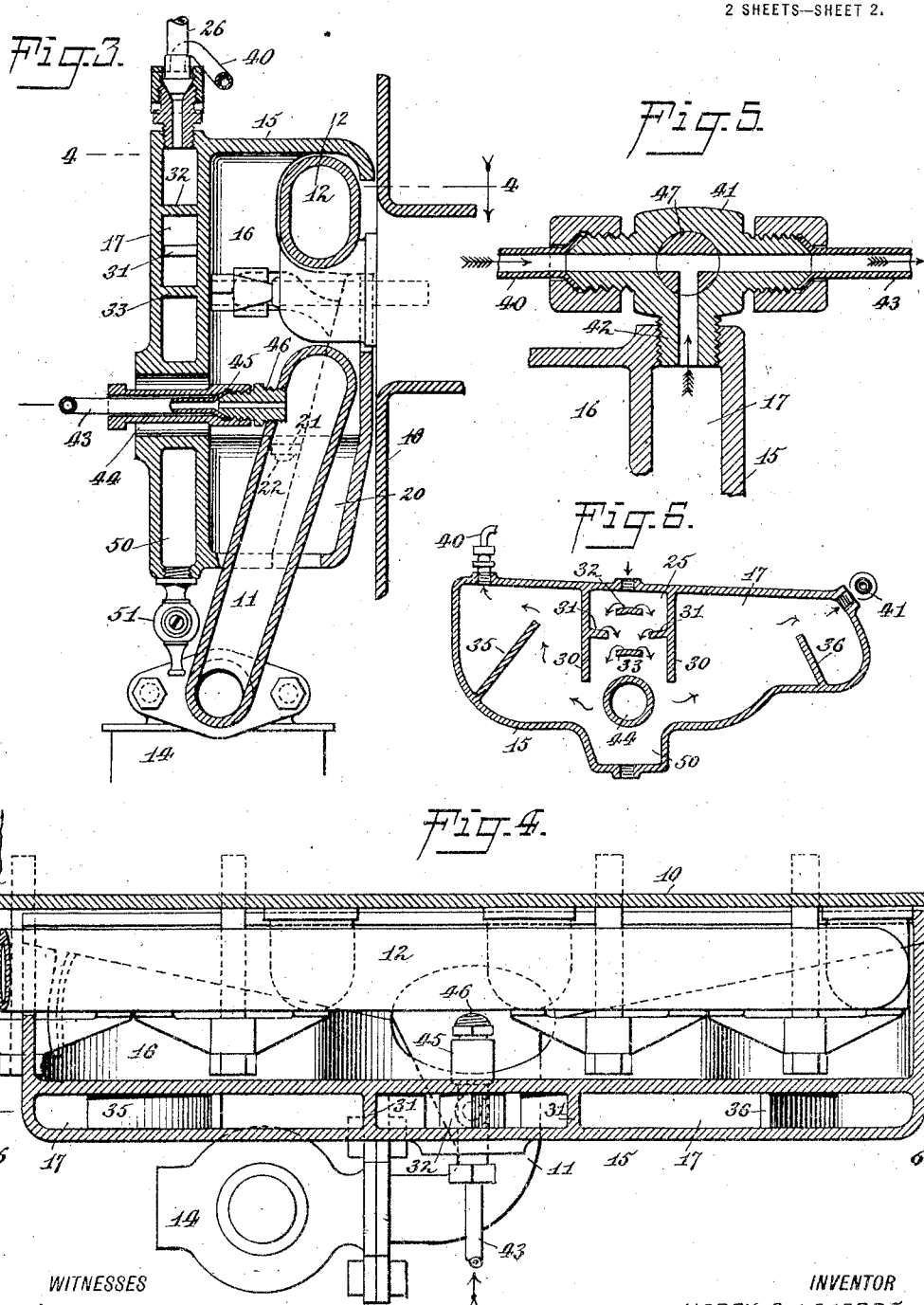

UNITED STATES PATENT OFFICE.

HARRY A. LACERDA, OF JERSEY CITY, NEW JERSEY, ASSIGNOR OF ONE-HALF TO RALPH W. BENSON, OF MOUNT VERNON, NEW YORK.

SUPERHEATER FOR INTERNAL-COMBUSTION ENGINES.

1,338,511.	Specification of Letters Patent.	Patented Apr. 27, 1920.

Application filed January 21, 1919. Serial No. 272,316.

*To all whom it may concern:*

Be it known that I, HARRY A. LACERDA, a citizen of the United States, and a resident of Jersey City, in the county of Hudson and State of New Jersey, have invented a new and Improved Superheater for Internal-Combustion Engines, of which the following is a full, clear, and exact description.

The object of the invention is to provide a new and improved superheater for internal combustion engines notably such as are used in automobiles, auto-trucks, marine and aerial vessels, and the like, and arranged to generate superheated steam and to supply the same to the explosive mixture to increase the efficiency thereof and to prevent the formation of carbon and other deposits in the cylinder. Another object is to dispense with the usual overflow pipe in the radiator.

With these and other objects in view the invention consists of certain novel features of construction as hereinafter shown and described and then specifically pointed out in the claims.

A practical embodiment of the invention is represented in the accompanying drawings forming a part of this specification in which similar characters of reference indicate corresponding parts in all the views.

Fig. 3 is an enlarged cross section of the superheater as applied, the section being on the line 3—3 of Fig. 1;

Fig. 4 is a horizontal sectional view of the same on the line 4—4 of Fig. 3;

Fig. 5 is an enlarged sectional side elevation of the valve controlling the flow of the steam from the superheater to the intake manifold; and Fig. 6 is a reduced sectional front elevation of the steam generating chamber in the casing of the superheater, the section being on the line 6—6 of Fig. 4.

Figure 1:
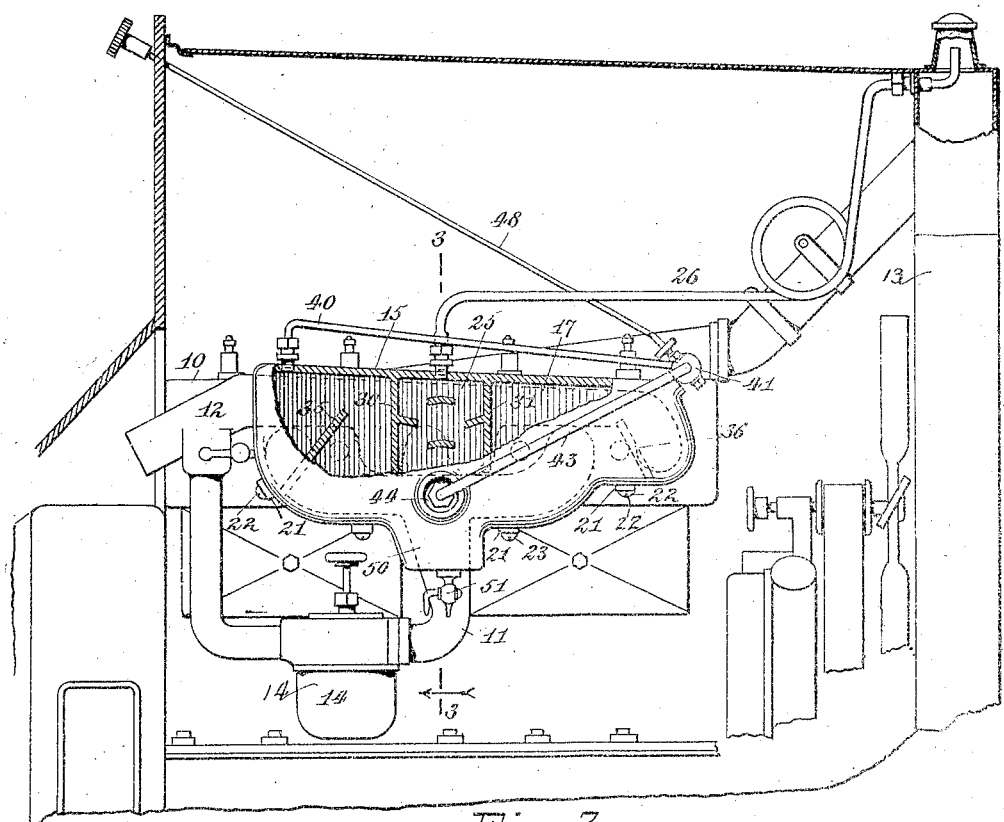
Figure 1 is a side elevation, partly in section, of an automobile engine provided with the improved superheater, a portion of which is shown in section.
Figure 2:
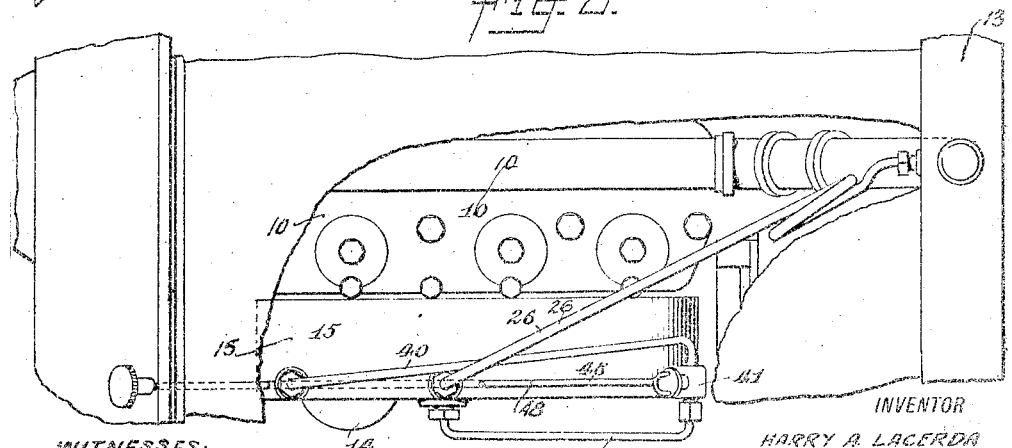
Fig. 2 is a plan view of the same with part of the hood broken out.

The automobile engine 10 illustrated in the drawings is of usual construction and is provided with an intake manifold 11, an exhaust manifold 12 and a radiator 13 for reducing the temperature of the water circulating through the water jackets of the engine cylinders to cool the same. The intake manifold 11 is connected with the usual carbureter 14 for supplying the engine with the usual explosive mixture.

The superheater comprises a casing 15 having a heating chamber 16 and a steam generating chamber 17, located in front of the heating chamber 16. The heating chamber 16 is arranged to inclose the manifolds 11 and 12 so that the heat from the exhaust gases passing through the exhaust manifold heat the interior of the heating chamber 16 which in turn heats the steam generating chamber 17. In practice, the chamber 16 has its lower rear portion 20 made in a separate section provided at the under side with transverse lugs 21 extending under the under side of the casing 15 and fastened thereto by screws 22 to removably hold the section 20 in place. It is understood that when placing the casing 15 in position on the manifolds 11 and 12, the section 20 is detached from the casing to allow of engaging the chamber 16 with the manifolds 11 and 12, and then the section 20 is fastened in place on the casing 15.

The interior of the steam generating chamber 17 is provided with a central compartment 25 connected at the top by a water supply pipe 26 with the interior of the radiator 13 at the top thereof, as plainly shown in Fig. 1. This pipe 26 takes the place of the usual overflow pipe of the radiator 13 and it conducts the water from the radiator 13 into the compartment 25. The compartment 25 is provided with side walls 30 having deflecting members 31 operating with centrally arranged deflecting members 32 and 33 arranged in staggered relation with the deflecting members 31, as plainly indicated in Fig. 6. The lower portion of the compartment 25 is open and it is evident that the water entering the top of this compartment is repeatedly divided by the deflecting members 32, 31 and 33 to insure a quick converting of the water into steam. The sides of the steam generating chamber 17 are provided with upwardly converging deflecting members 35, 36 to retard the flow of the steam in the steam generating chamber 17 from the middle to the end portions thereof. The end of the steam generating chamber 17 adjacent the deflecting member 35 is provided with a steam pipe 40 connected with a valve 41 having a nipple 42 screwing into the end of the chamber 17 adjacent the deflecting member 36, as will be readily understood by reference to Figs. 5 and 6. The valve 41 is provided with an outlet pipe 43 which extends through a passage 44 formed in the front of the casing 15 and extending through the steam generating chamber 17. The end of this pipe 43 is connected by a coupling 45 with a nipple 46 screwing into the intake manifold 11 within the heating chamber 16, as plainly shown in Fig. 3. The plug 47 of the valve 41 is connected with a controlling rod 48 extending within reach of the operator of the automobile to open or close the valve plug 47 whenever it is desired to do so.

It will be noticed that by the arrangement described the water passing from the radiator 13 by way of the pipe 26 into the compartment 25 of the steam generating chamber 17 is quickly converted into steam and this steam is superheated and finally passes by way of the pipe 40 and the nipple 42 into the valve 41 from which the steam passes by way of the pipe 43 and nipple 46 into the intake manifold 11 to mix with the explosive mixture and to pass with the same into the cylinders. It is understood that supplying the explosive mixture with superheated steam increases the efficiency of the motive agent and prevents the formation of carbon and other deposits in the cylinders of the internal combustion engine.

The bottom of the steam generating chamber 17 is provided with a well 50 for receiving any water of condensation and the bottom of the well 50 is provided with a drain cock 51 for draining the water of condensation out of the steam generating chamber 17 whenever it is desired to do so.

From the foregoing it will be seen that the superheater can be readily attached to the internal combustion engine without making any alterations except tapping the nipple 46 into the intake manifold 11 and dispensing with the overflow pipe in the radiator 13.

It will also be noticed that by the use of the deflecting or baffling members in the steam generating chamber 17 the water is quickly converted into steam and the latter is superheated prior to passing out of the steam generating chamber 17 and passing into the intake manifold 11, as previously explained.

Having thus described my invention, I claim as new and desire to secure by Letters Patent:—

1. A superheater attachment for internal combustion engines, comprising a separable casing provided with a heating chamber and with a baffled-walled steam generating chamber disposed side by side, the said heating chamber inclosing the intake and exhaust manifolds of the engine, a water supply connected with the said steam generating chamber, and a steam connection connecting the said steam generating chamber with the said intake manifold.

2. A superheater attachment for internal combustion engines, comprising a casing having a vertically-extending heating chamber adapted to inclose the intake and exhaust manifolds of the engine to heat the interior of the casing from the heat radiating from the manifolds, said casing having a detachable bottom portion, a similarly extending steam generating chamber arranged on the said casing and heated by the heat in the said heating chamber, a supply connection connecting the said generating chamber with the radiator of the engine, and a steam connection connecting the said steam generating chamber with the said manifold and extending through the same.

3. A superheater attachment for internal combustion engines, comprising a casing having a heating chamber and a steam generating chamber, the said heating chamber being adapted to inclose the intake and exhaust manifolds of the engine, the said steam generating chamber being arranged in front of the heating chamber and being heated from the latter, the said steam generating chamber having an entrance compartment open at the bottom and provided with deflecting means, a water supply pipe connected with the top of the said compartment in the steam generating chamber above the said deflecting means in the compartment, steam pipes leading from the top of the steam generating chamber at the ends thereof, a manually controlled valve connected with the said steam pipes, and a steam supply pipe connecting the said valve with the said intake manifold.

4. A superheater attachment for internal combustion engines, comprising a casing having a heating chamber and a steam generating chamber, the said heating chamber being adapted to inclose the intake and exhaust manifolds of the engine, the said steam generating chamber being arranged in front of the heating chamber and being heated from the latter, the said steam generating chamber having an entrance compartment open at the bottom and provided with deflecting means, a water supply pipe connected with the top of the said compartment in the steam generating chamber above the said deflecting means in the compartment, steam pipes leading from the top of the steam generating chamber at the ends thereof, a manually controlled valve connected with the said steam pipes, and a steam supply pipe connecting the said valve with the said intake manifold, the said steam generating chamber having a passage thereto into the heating chamber for the passage of the said steam supply pipe to connect the latter with the intake manifold within the heating chamber.

5. A superheater attachment for internal combustion engines, comprising a casing having a heating chamber and a steam generating chamber, the said heating chamber being adapted to inclose the intake and exhaust manifolds of the engine, the said steam generating chamber being arranged in front of the heating chamber and being heated from the latter, the said steam generating chamber having an entrance compartment open at the bottom and provided with deflecting means, the said steam generating chamber being provided with upwardly converging deflecting means adjacent the ends, a water supply pipe connected with the top of the said compartment in the steam generating chamber above the said deflecting means in the compartment, steam pipes leading from the top of the steam generating chamber at the ends thereof, a manually controlled valve connected with the said steam pipes, and a steam supply pipe connecting the said valve with the said intake manifold.

6. A superheater attachment for internal combustion engines, comprising a casing having a heating chamber and a steam generating chamber, the said heating chamber being adapted to inclose the intake and exhaust manifolds of the engine, the said steam generating chamber being arranged in front of the heating chamber and being heated from the latter, the said steam generating chamber having an entrance compartment open at the bottom and provided with deflecting means, the said steam generating chamber being provided at the bottom with a well for the accommodation of water of condensation, a drip cock on the said well, a water supply pipe connected with the top of the said compartment in the steam generating chamber above the said deflecting means in the compartment, steam pipes leading from the top of the steam generating chamber at the ends thereof, a manually controlled valve connected with the said steam pipes, and a steam supply pipe connecting the said valve with the said intake manifold.

7. In combination, an internal combustion engine having intake and exhaust manifolds, a radiator, a super-heater provided with a casing having a partition dividing the same into a heating chamber and a steam-generating chamber, the said heating chamber inclosing the manifolds, means to detachably mount the casing on the engine, a water-supply pipe connecting the said steam-generating chamber with the said radiator, said steam-generating chamber having an intermediate baffle-walled entrance compartment and outlet compartments at the ends thereof, steam pipes leading from the ends of the steam-generating chamber, a valve connected with the said steam pipes, and a steam pipe leading from the said valve and connected with the said intake manifold through said chambers.

HARRY A. LACERDA.